(12) United States Patent
Lin

(10) Patent No.: US 11,082,963 B2
(45) Date of Patent: Aug. 3, 2021

(54) METHOD, TERMINAL DEVICE AND NETWORK DEVICE FOR TRANSMITTING UPLINK CONTROL INFORMATION

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 49 days.

(21) Appl. No.: 16/724,719

(22) Filed: Dec. 23, 2019

(65) Prior Publication Data

US 2020/0128536 A1 Apr. 23, 2020

Related U.S. Application Data

(63) Continuation of application No. PCT/CN2018/081875, filed on Apr. 4, 2018.

(51) Int. Cl.
*H04W 72/04* (2009.01)
*H04L 1/18* (2006.01)

(52) U.S. Cl.
CPC ....... *H04W 72/0413* (2013.01); *H04L 1/1854* (2013.01)

(58) Field of Classification Search
None
See application file for complete search history.

(56) References Cited

U.S. PATENT DOCUMENTS

2015/0029972 A1* 1/2015 Park ................ H04L 1/1812
370/329
2019/0363840 A1* 11/2019 Wang ............... H04L 1/1861
(Continued)

FOREIGN PATENT DOCUMENTS

CN 101998539 A 3/2011
CN 103068047 A 4/2013
(Continued)

OTHER PUBLICATIONS

The First Chinese Office Action dated Jan. 6, 2020; Appln. No. 201880003191.3.
(Continued)

*Primary Examiner* — Hassan A Phillips
*Assistant Examiner* — Gautam Sharma

(57) ABSTRACT

Embodiments of the present disclosure disclose a method, a terminal device, and a network device for transmitting uplink control information, where the method includes: determining, by the terminal device, a second time domain resource set from a pre-configured first time domain resource set, where each time unit in the second time domain resource set is a candidate time domain unit for transmitting downlink data, wherein the first time domain resource set is determined according to an Acknowledgement (ACK)/Negative Acknowledgement (NACK) feedback timing sequence set of the downlink data; and transmitting, by the terminal device, in a target time unit, ACK/NACK feedback information corresponding to each time unit in the second time domain resource set to the network device. The method, terminal device and network device of the embodiments of the present disclosure are beneficial to reduce ACK/NACK feedback overhead.

18 Claims, 4 Drawing Sheets

(56) References Cited

U.S. PATENT DOCUMENTS

| | | | |
|---|---|---|---|
| 2020/0106566 A1* | 4/2020 | Yeo | H04W 28/04 |
| 2020/0252165 A1* | 8/2020 | Nunome | H04L 1/1607 |
| 2020/0266931 A1* | 8/2020 | Gou | H04L 1/00 |
| 2020/0337077 A1* | 10/2020 | Yoshimura | H04L 1/16 |
| 2020/0359401 A1* | 11/2020 | Yoshimura | H04L 1/1819 |
| 2020/0389878 A1* | 12/2020 | Karaki | H04L 1/1822 |
| 2020/0404634 A1* | 12/2020 | He | H04L 1/1887 |
| 2021/0006377 A1* | 1/2021 | Hooli | H04L 1/1864 |
| 2021/0075556 A1* | 3/2021 | Karaki | H04W 74/0816 |
| 2021/0075571 A1* | 3/2021 | Manolakos | H04L 5/0051 |
| 2021/0084623 A1* | 3/2021 | Zhang | H04W 72/046 |
| 2021/0099255 A1* | 4/2021 | Gao | H04W 72/042 |

FOREIGN PATENT DOCUMENTS

| | | | |
|---|---|---|---|
| CN | 103944701 A | | 7/2014 |
| CN | 104104477 A | | 10/2014 |
| CN | 104811281 A | | 7/2015 |
| CN | 104811286 A | | 7/2015 |
| CN | 105245316 A | | 1/2016 |
| WO | 2014051407 A1 | | 4/2014 |

OTHER PUBLICATIONS

Nokia, Nokia Shanghai Bell; "Remaining aspects of HARQ management", 3GPP TSG RAN WG1 Meeting 90bis; R1-1718621; Oct. 13, 2017, 10 pages.

The second Office Action of corresponding Chinese application No. 201880003191.3, dated May 11, 2020.

The EESR of corresponding European application No. 18913651.8, dated Jul. 7, 2020.

NTT Docomo et al:"HARQ-ACK multiplexing", 3GPP Draft; R1-1713957, 3rd Generation Partnership Project (3GPP), vol. RAN WG1, No. Prague, Czechia; Aug. 21, 2017-Aug. 25, 2017 Aug. 20, 2017(Aug. 20, 2017), XP051316749.

Lenovo et al:"Remaining issues on HARQ-ACK feedback timing determination for SPS PDSCH", 3GPP Draft; R1-1800404—Final, 3rd Generation Partnership Project (3GPP), vol. RAN WG1, No. Vancouver, Canada; Jan. 22, 2018-Jan. 26, 2018 Jan. 12, 2018(Jan. 12, 2018), XP051384324.

The first Office Action of corresponding European application No. 18913651.8, dated Jan. 22, 2021.

* cited by examiner

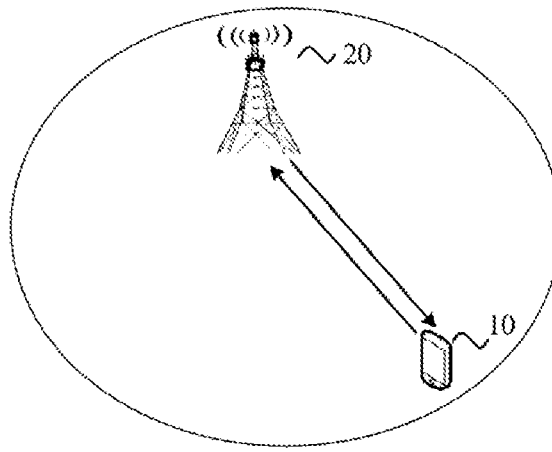

FIG. 1

100 | A terminal device determines a second time domain resource set from a pre-configured first time domain resource set, where each time unit in the second time domain resource set is a candidate time domain unit for transmitting downlink data, where the first time domain resource set is determined according to an Acknowledgement (ACK)/Negative Acknowledgement (NACK) feedback timing sequence set of the downlink data ~110

The terminal device transmits, in a target time unit, ACK/NACK feedback information corresponding to each time unit in the second time domain resource set to a network device ~120

FIG. 2

Feedback timing sequence set is {1, 2, 3, 4, 5, 6, 7, 8}

Feedback timing sequence set is {1, 2, 3, 4, 5, 6, 7, 8}

METHOD, TERMINAL DEVICE AND NETWORK DEVICE FOR TRANSMITTING UPLINK CONTROL INFORMATION

CROSS-REFERENCE TO RELATED APPLICATIONS

This application is a continuation of the International Application No. PCT/CN2018/081875, filed on Apr. 4, 2018, the content of which is incorporated herein by reference in its entirety.

TECHNICAL FIELD

Embodiments of the present disclosure relate to the field of communication, and in particular, to a method, a terminal device, and a network device for transmitting uplink control information.

BACKGROUND

In the current New Radio (NR) system, a Physical Downlink Shared Channel (PDSCH) supports dynamic indication of feedback acknowledgement information. For example, a network device may pre-configure a feedback timing sequence set for a terminal device, and the set may include 8 values $\{K1_0, K1_1, K1_2, K1_3, K1_4, K1_4, K1_4, K1_6, K1_7\}$. If the PDSCH is transmitted in a time unit n, and Downlink Control Information (DCI) used to schedule the PDSCH may include a target information domain which is used to indicate a value $K1_i$ in the feedback timing sequence set, then the terminal device may transmit Acknowledgement (ACK)/Negative Acknowledgement (NACK) information corresponding to the PDSCH in a time unit $(n+K1_i)$.

An ACK/NACK multiplexing transmission is also supported in the NR system, that is, ACK/NACK information corresponding to multiple PDSCHs can be transmitted through one Physical Uplink Control Channel (PUCCH). A feedback information sequence transmitted by the terminal device is determined based on the number of values the feedback timing sequence set.

A downlink transmission of the current NR system also supports inter-time unit scheduling, that is, the downlink control information and the corresponding PDSCH are transmitted in different time units, and the downlink control information is transmitted at first. Thus there may be overhead waste for the feedback of ACK/NACK information by the terminal device.

SUMMARY

In view of this, embodiments of the present disclosure provides a method, a terminal device, and a network device for transmitting uplink control information, which is beneficial to reduce the overhead to feed back ACK/NACK information.

In a first aspect, a method for transmitting uplink control information is provided, where the method includes: determining, by a terminal device, a second time domain resource set from a pre-configured first time domain resource set, where each time unit in the second time domain resource set is a candidate time domain unit for transmitting downlink data, where the first time domain resource set is determined according to an Acknowledgement (ACK)/Negative Acknowledgement (NACK) feedback timing sequence set of the downlink data; and transmitting, by the terminal device, in a target time unit, ACK/NACK feedback information corresponding to each time unit in the second time domain resource set to a network device.

In a possible implementation, the determining, by a terminal device, a second time domain resource set from a pre-configured first time domain resource set, includes: determining, by the terminal device, the second time domain resource set from the first time domain resource set according to a pre-configured downlink scheduling timing sequence set.

In a possible implementation, each element in the downlink scheduling timing sequence set corresponds to a value of a downlink scheduling timing sequence in each row in a physical downlink shared channel (PDSCH) symbol allocation table; or each element in the downlink scheduling timing sequence set corresponds to a value of a downlink scheduling timing sequence in at least one row in the PDSCH symbol allocation table, and values of different elements in the downlink scheduling timing sequence set are different.

In a possible implementation, the determining, by a terminal device, a second time domain resource set from a pre-configured first time domain resource set, includes: determining, by the terminal device, if all time units of at least one time unit corresponding to a first downlink time unit in the first time domain resource set are not used to transmit downlink control information (DCI), that the second time domain resource set does not include the first downlink time unit; or determining, by the terminal device, if at least one time unit corresponding to the first downlink time unit in the first time domain resource set is used to transmit the downlink control information, that the second time domain resource set includes the first downlink time unit.

In a possible implementation, all time units of the at least one time unit corresponding to a first downlink time unit in the first time domain resource set is not used to transmit downlink control information (DCI), includes: all of the at least one time unit is a non-downlink control channel monitoring time point, or all of the at least one time unit is allocated as an uplink transmission resource.

In a possible implementation, the determining, by the terminal device, the second time domain resource set from the first time domain resource set according to a pre-configured downlink scheduling timing sequence set, includes: determining, by the terminal device, that a time unit $(n-K_{1,k})$ in the first time domain resource set is not a time unit in the second time domain resource set, where, a time unit $(n-K_{1,k}-\tilde{K}_0)$ is not used to transmit downlink control information (DCI), n is the target time unit, $K_{1,k}$ is a $k^{th}$ value in the ACK/NACK feedback timing sequence set, and $\tilde{K}_0$ is the downlink scheduling timing sequence set.

In a possible implementation, the downlink data includes a physical downlink shared channel (PDSCH) and/or a physical downlink control channel (PDCCH) indicating a semi-persistent scheduling (SPS) resource release.

In a possible implementation, the one time unit is one time slot.

In a second aspect, a method for transmitting uplink control information is provided, where the method includes: receiving, by a network device, in a target time unit, feedback information corresponding to each time unit in a second time domain resource set transmitted by a terminal device, where, the second time domain resource set is determined from a pre-configured first time domain resource set, each time unit in the second time domain resource set is a candidate time domain unit for transmitting downlink data, and the first time domain resource set is determined according to an Acknowledgement (ACK)/Negative Acknowledgement (NACK) feedback timing sequence set of the downlink data.

In a possible implementation, the second time domain resource set does not include a first downlink time unit in the first time domain resource set, wherein all time units of at least one time unit corresponding to the first downlink time unit are not used to transmit downlink control information (DCI).

In a possible implementation, all time units of the at least one time unit corresponding to the first downlink time unit in the first time domain resource set is not used to transmit downlink control information (DCI), including: all of the at least one time unit is a non-downlink control channel monitoring time point, or all of the at least one time unit is allocated as an uplink transmission resource.

In a possible implementation, the second time domain resource set does not include a time unit ($n-K_{1,k}$) in the first time domain resource set, where, a time unit ($n-K_{1,k}-\tilde{K}_0$) is not used to transmit downlink control information (DCI), n is the target time unit, $K_{1,k}$ is a $k^{th}$ value in the ACK/NACK feedback timing sequence set, and $\tilde{K}_0$ is a downlink scheduling timing sequence set.

In a possible implementation, each element in the downlink scheduling timing sequence set corresponds to a value of a downlink scheduling timing sequence in each row in a physical downlink shared channel (PDSCH) symbol allocation table; or each element in the downlink scheduling timing sequence set corresponds to a value of a downlink scheduling timing sequence in at least one row in the PDSCH symbol allocation table, and values of different elements in the downlink scheduling timing sequence set are different.

In a possible implementation, the downlink data includes a physical downlink shared channel (PDSCH) and/or a physical downlink control channel (PDCCH) indicating a semi-persistent scheduling (SPS) resource release.

In a possible implementation, the one time unit is one time slot.

In a third aspect, a terminal device is provided for performing the method of any of the above first aspect or any of the above possible implementations of the first aspect. Specifically, the terminal device includes units used to perform the method of any of the above first aspect or any of the above possible implementations of the first aspect.

In a fourth aspect, a network device is provided for performing the method of any of the above second aspect or any of the above possible implementations of the second aspect. Specifically, the network device includes units used to perform the method of any of the above second aspect or any of the above possible implementations of the second aspect.

In a fifth aspect, a terminal device is provided, the terminal device includes: a memory, a processor, an input interface, and an output interface. Where, the memory, the processor, the input interface, and the output interface are connected by a bus system. The memory is configured to store instructions, and the processor is configured to execute the instructions stored by the memory for performing the method of any of the above first aspect or any of the above possible implementations of the first aspect.

In a sixth aspect, a network device is provided, the network device includes: a memory, a processor, an input interface, and an output interface. The memory, the processor, the input interface, and the output interface are connected by a bus system. The memory is configured to store instructions, and the processor is configured to execute the instructions stored by the memory for performing the method of any of the above second aspect or any of the above possible implementations of the second aspect.

In a seventh aspect, a computer storage medium is provided for storing a method for performing any of the above first aspect or any of the above possible implementations of the first aspect, or for storing computer software instructions used in a method of any of the above second aspect or any of the above possible implementations of the second aspect, the computer software instructions include programs designed to perform the above aspects.

In an eighth aspect, a computer program product including instructions is provided, when executed on a computer, the computer program product causes the computer to perform the method of the above first aspect or any of the optional implementations of the first aspect, or the method of the above second aspect or any of the optional implementations of the second aspect.

These and other aspects of the present disclosure will be more readily apparent in the following description of the embodiments.

BRIEF DESCRIPTION OF DRAWINGS

FIG. 1 shows a schematic diagram of an application scenario according to an embodiment of the present disclosure.

FIG. 2 shows a schematic block diagram of a method for transmitting uplink control information according to an embodiment of the present disclosure.

DESCRIPTION OF EMBODIMENTS

Figure 3:
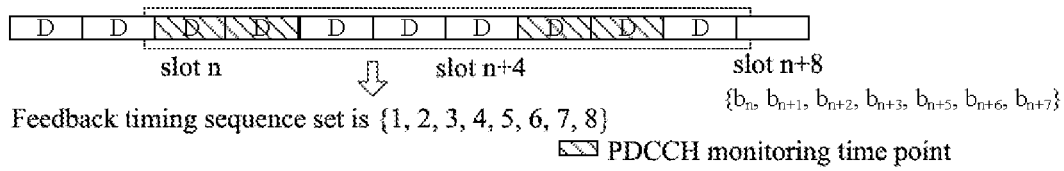
FIG. 3 shows another schematic block diagram of a method for transmitting uplink control information according to an embodiment of the present disclosure.

The technical solutions in the embodiments of the present disclosure will be clearly and completely described in the following in combination with the accompanying drawings in the embodiments of the present disclosure.

It should be understood that the technical solutions of the embodiments of the present disclosure can be applied to various communication systems, for example: a Global System of Mobile communication (GSM) system, a Code Division Multiple Access (CDMA) system, a Wideband Code Division Multiple Access (WCDMA) system, a General Packet Radio Service (GPRS), a Long Term Evolved (LTE) system, an LTE Frequency Division Duplex (FDD) System, an LTE Time Division Duplex (TDD) system, an Universal Mobile Telecommunication System (UMTS), a Worldwide Interoperability for Microwave Access (WiMAX) communication system, a New Radio (NR) or a future 5G system, or the like.

In particular, the technical solutions of the embodiments of the present disclosure can be applied to various communication systems based on non-orthogonal multiple access technology, such as a Sparse Code Multiple Access (SCMA) system, and a Low Density Signature (LDS) system, or the like, of course, the SCMA system and the LDS system may also be referred to as other names in the communication field; further, the technical solutions of the embodiments of the present disclosure can be applied to multi-carrier transmission system employing non-orthogonal multiple access technology, for example, an Orthogonal Frequency Division Multiplexing (OFDM), a Filter Bank Multi-Carrier (FBMC), a Generalized Frequency Division Multiplexing (GFDM), and a Filtered-OFDM (F-OFDM) system, or the like.

The terminal device in the embodiments of the present disclosure may refer to a User Equipment (UE), an access terminal, a subscriber unit, a subscriber station, a mobile station, a mobile site, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to wireless modems, an in-vehicle device, a wearable device, a terminal device in a future 5G network, or a terminal device in a future evolved Public Land Mobile Network (PLMN) or the like, the embodiments of the present disclosure do not limit.

The network device in the embodiments of the present disclosure may be a device used to communicate with a terminal device, where the network device may be a Base Transceiver Station (BTS) in a GSM or CDMA, or may be a base station (NodeB, NB) in a WCDMA system, and may also be an Evolutional base station (eNB or eNodeB) in a LTE system, or may be a wireless controller in a Cloud Radio Access Network (CRAN) scenario, or the network device may be a relay station, an access point, an in-vehicle device, a wearable device, and a network device in a future 5G network or a network device in a future evolved PLMN network or the like, the embodiments of the present disclosure do not limit.

FIG. 1 is a schematic diagram of an application scenario according to an embodiment of the present disclosure. A communication system in FIG. 1 may include a terminal device 10 and a network device 20. The network device 20 is configured to provide communication services for the terminal device 10 and access a core network. The terminal device 10 accesses a network by searching for synchronization signals, broadcast signals, or the like transmitted by the network device 20, thereby performing communication with the network. The arrows shown in FIG. 1 may represent uplink/downlink transmissions performed by a cellular link between the terminal device 10 and the network device 20.

In the current NR system, a PDSCH supports dynamic indication of feedback acknowledgement information. For example, the network device may pre-configure an ACK/NACK feedback timing sequence set for the terminal device, and the set may include 8 values $\{K1_0, K1_1, K1_2, K1_3, K1_4, K1_5, K1_6, K1_7\}$. If the PDSCH is transmitted in a time unit n, and DCI used to schedule the PDSCH may include a target information domain which is used to indicate a value $K1_i$ in the feedback timing sequence set, the terminal device may transmit ACK/NACK information corresponding to the PDSCH in a time unit $(n+K1_i)$. For DCI format 1_0, the corresponding ACK/NACK feedback timing sequence set is constant as $\{1, 2, 3, 4, 5, 6, 7, 8\}$. For DCI format 1_1, values in the ACK/NACK feedback timing sequence set is configured by high layer parameters.

In addition, an ACK/NACK multiplexing transmission is supported in the NR system, that is, ACK/NACK information corresponding to multiple PDSCHs is transmitted through one PUCCH. For the ACK/NACK multiplexing transmission, two kinds of ACK/NACK information generation manner are further supported: semi-statically determining the number of ACK/NACK bits and dynamically determining the number of ACK/NACK bits. When configured to semi-statically determine the number of ACK/NACK bits, the terminal determines the number of ACK/NACK bits according to the number of elements in the supported ACK/NACK feedback timing sequence set.

A downlink transmission of the current NR system supports inter-time unit scheduling, that is, the DCI and the corresponding PDSCH are transmitted in different time units. A time interval set between the PDCCH and the PDSCH is represented by $\tilde{K}_0$. $\tilde{K}_0$ can be configured by the network device, for example, $\tilde{K}_0$ can be $\{0, 1, 2\}$. In this case, some time units in the ACK/NACK feedback timing sequence set may never be scheduled to transmit the PDSCH, thus there may be a problem of wasting ACK/NACK feedback overhead.

FIG. 2 is a schematic block diagram of a method 100 for transmitting uplink control information according to an embodiment of the present disclosure. As shown in FIG. 2, the method 100 includes some or all of the following:

S110, a terminal device determines a second time domain resource set from a pre-configured first time domain resource set, where each time unit in the second time domain resource set is a candidate time domain unit for transmitting downlink data, where the first time domain resource set is determined according to an Acknowledgement (ACK)/Negative Acknowledgement (NACK) feedback timing sequence set of the downlink data;

S120, the terminal device transmits, in a target time unit, ACK/NACK feedback information corresponding to each time unit in the second time domain resource set to a network device.

Specifically, the network device may pre-configure multiple PDSCH time domain transmission resource sets, that is, the first time domain resource set herein, to the terminal device through a high layer signaling. The first time domain resource set may be determined according to the ACK/NACK feedback timing sequence set. For example, if the terminal device needs to transmit the ACK/NACK feedback information to the network device in a $n^{th}$ time unit, and the ACK/NACK feedback timing sequence set is $\{1, 2, 3, 4, 5, 6, 7, 8\}$, then, it can be considered that the network device has configured 8 PDSCH time domain transmission resources for the terminal device, including time units (n−1), (n−2), (n−3), (n−4), (n−5), (n−6), (n−7) and (n−8). The terminal device may further determine the second time domain resource set from the first time domain resource set based on a certain rule, that is, the second time domain resource set may be a subset of the first time domain resource set, the second time domain resource set may be an empty set, and may also include all elements in the first time domain resource set. After the terminal device determines the second time domain resource set, the terminal device may feed back, on the target time unit, the ACK/NACK feedback information corresponding to each time unit in the second time domain resource set to the network device. For example, the target time unit is the time unit n in the above example.

Therefore, according to the method for transmitting uplink control information in the embodiment of the present disclosure, the ACK/NACK feedback overhead can be reduced when the second time domain resource set is a subset of the first time domain resource set.

In the embodiment of the present disclosure, the terminal device determines the second time domain resource set from the first time domain resource set pre-configured by the network device, including: the terminal device determines the second time domain resource set from the first time domain resource set according to a pre-configured downlink scheduling timing sequence set.

As mentioned above, a downlink transmission supports inter-time unit scheduling, and the network device can configure a downlink scheduling timing sequence set for the terminal device in advance, and the value of each element in the downlink scheduling timing sequence set represents a time interval between the DCI and the corresponding PDSCH. For example, the downlink scheduling timing sequence set is $\tilde{K}_0$, and $\tilde{K}_0$ may be $\{1, 2\}$. If the network device issues the PDCCH to the terminal device in the $n^{th}$ time unit, the terminal device may consider that the PDSCH corresponding to the PDCCH may be in time units (n+1) and (n+2). In other words, if the network device transmits the PDSCH to the terminal device at the $(n+2)^{th}$ time unit, then the network device may transmit the PDCCH to the terminal device at the time unit n or the time unit (n+1). Then, the terminal device may determine, based on each value in the downlink scheduling timing sequence set, each time unit in the first time domain resource set, which is scheduled to transmit the PDSCH.

Taking a first time unit in the first time domain resource set as an example, if the terminal device determines that at least one time unit, that is likely to be scheduled to transmit the PDSCH as determined according to each value in the downlink scheduling timing sequence set, is not used to transmit the downlink control information, for example, the at least one time unit is not a downlink control channel monitoring time point at all or the at least one time unit is allocated for transmitting an uplink signal or other signals, or the like, the terminal device may then remove the first time unit from the first time domain resource set. If the terminal device determines that at least one time unit, that is likely to be scheduled to transmit the PDSCH as determined according to a certain value in the downlink scheduling timing sequence set, is used to transmit the downlink control information, the terminal device then reserves the first time unit in the first time domain resource set, and so on. After the terminal device performs the judgment for each time unit in the first time domain resource set in the manner described above, the reserved elements in the first time domain resource set constitute the second time domain resource set.

In the embodiment of the present disclosure, the terminal device determines the second time domain resource set from the first time domain resource set according to the pre-configured downlink scheduling timing sequence set, including: the terminal device determines a time unit $(n-K_{1,k})$ in the first time domain resource set is not a time unit in the second time domain resource set, where a time unit $(n-K_{1,k}-\tilde{K}_0)$ is not used to transmit the downlink control information, n is the target time unit, $K_{1,k}$ is a $k^{th}$ value in the ACK/NACK feedback timing sequence set, and $\tilde{K}_0$ is the downlink scheduling timing sequence set.

A method for transmitting uplink control information provided by an embodiment of the present disclosure is described in detail below in combination with FIG. 3 and FIG. 4.

Embodiment 1: In a case of single carrier and single codeword transmission, the ACK/NACK feedback timing sequence set is $\{1, 2, 3, 4, 5, 6, 7, 8\}$, where PDCCH monitoring time points are slots n, n+1, n+5, n+6, set $\tilde{K}_0$:$\{1, 2\}$. As shown in FIG. 3, if the PDSCH is to be transmitted in downlink slot n+4, its corresponding DCI needs to be transmitted in slot n+2 or n+3. However, neither of the two slots is a PDCCH monitoring time point, so the DCI is not transmitted. Thus, there will be no PDSCH transmission in slot n+4, and there will be no corresponding ACK/NACK information. The feedback information sequence may contain only 7 bits information, namely $\{b_n, b_{n+1}, b_{n+2}, b_{n+3}, b_{n+5}, b_{n+6}, b_{n+7}\}$.

Embodiment 2: In a case of single carrier and single codeword transmission, the ACK/NACK feedback timing sequence set is $\{1, 2, 3, 4, 5, 6, 7, 8\}$, where slot n+2~n+4 are uplink slots, all downlink slots are PDCCH monitoring time points. Set $\tilde{K}_0$:$\{1, 2\}$, as shown in FIG. 4, if the PDSCH is to be transmitted in downlink slot n+5, its corresponding DCI needs to be transmitted in slot n+3 or n+4. However, both of slots n+3 and n+4 are uplink slots, so the DCI is not transmitted. Thus, there will be no PDSCH transmission in slot n+5, and there will be no corresponding ACK/NACK information. The feedback information sequence may contain only 4 bits information, namely $\{b_n, b_{n+1}, b_{n+6}, b_{n+7}\}$.

It should be understood that the above Embodiment 1 and Embodiment 2 are described by taking one time unit as one time slot as an example. The one time unit may also be another unit, such as a subframe, and the embodiment of the present disclosure is not limited thereto.

It should also be understood that the transmission manners, such as the single carrier and single code word transmission, involved in the above Embodiment 1 and Embodiment 2 are also for schematic examples only.

In the embodiment of the present disclosure, each element in the downlink scheduling timing sequence set corresponds to a value of a downlink scheduling sequence in each row of a physical downlink shared channel (PDSCH) symbol allocation table; or, each element in the downlink scheduling timing sequence set corresponds to a value of a downlink scheduling sequence in at least one row of the PDSCH symbol allocation table, and values of different elements in the downlink scheduling timing sequence set are different.

Specifically, the network device may indicate a piece of PDSCH symbol allocation table to the terminal device through a high layer signaling, where each row of the PDSCH symbol allocation table has one value of downlink scheduling timing sequence. Then, the terminal device may acquire the downlink scheduling timing sequence set from the PDSCH symbol allocation table, which may be a set composed of the value of the downlink scheduling timing sequence in each row of the PDSCH symbol allocation table. For example, the PDSCH symbol allocation table has a total of 5 rows, and the value of the downlink scheduling timing sequence in each row is respectively $K_{0,1}, K_{0,2}, K_{0,3}, K_{0,4}, K_{0,5}$, then the downlink scheduling timing sequence set $\tilde{K}_0$ may be $\{K_{0,1}, K_{0,2}, K_{0,3}, K_{0,4}, K_{0,5}\}$. And any two values of $K_{0,1}, K_{0,2}, K_{0,3}, K_{0,4}, K_{0,5}$ may be the same or different. For example again, the PDSCH symbol allocation table has a total of 5 rows, and the value of the downlink scheduling timing sequence in each row is respectively $K_{0,1}, K_{0,2}, K_{0,3},$ $K_{0,4}$, $K_{0,5}$. If $K_{0,1}=K_{0,2}$, then, the downlink scheduling timing sequence set $\tilde{K}_0$ may be {$K_{0,1}$ or $K_{0,2}$, $K_{0,3}$, $K_{0,4}$, $K_{0,5}$}.

Figure 5:
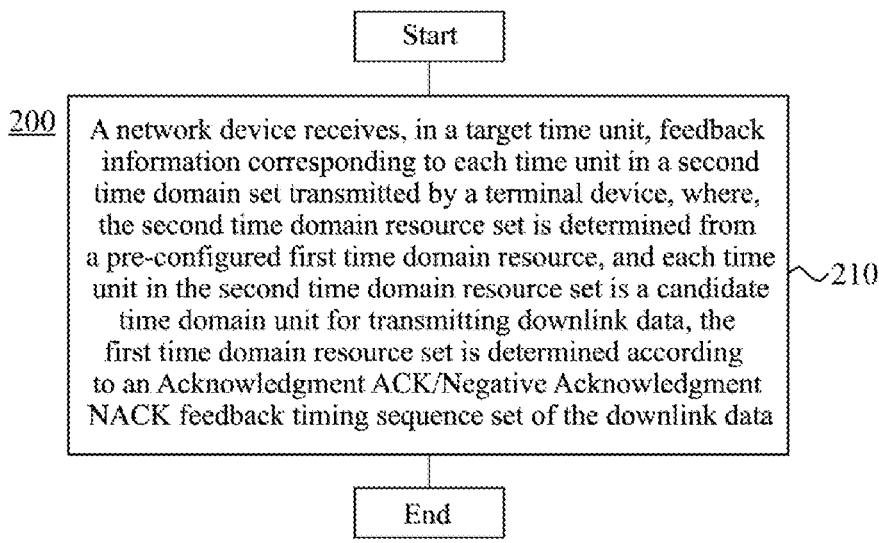
FIG. 5 shows a schematic block diagram of another method for transmitting uplink control information according to an embodiment of the present disclosure.

FIG. 5 is a schematic block diagram of a method 200 of transmitting uplink control information according to an embodiment of the present disclosure. As shown in FIG. 5, the method 200 includes some or all of the following:

S210, a network device receives, in a target time unit, feedback information corresponding to each time unit in a second time domain set transmitted by a terminal device, where the second time domain resource set is determined from a pre-configured first time domain resource set, each time unit in the second time domain resource set is a candidate time domain unit for transmitting downlink data, and the first time domain resource set is determined according to an Acknowledgement (ACK)/Negative Acknowledgement (NACK) feedback timing sequence set of the downlink data.

Therefore, according to the method for transmitting uplink control information in the embodiment of the present disclosure, the ACK/NACK feedback overhead can be reduced when the second time domain resource set is a subset of the first time domain resource set.

In the embodiment of the present disclosure, the second time domain resource set does not include a first downlink time unit in the first time domain resource set, where all time units of at least one time unit corresponding to the first downlink time unit are not used to transmit downlink control information (DCI).

In the embodiment of the present disclosure, the at least one time unit corresponding to the first downlink time unit in the first time domain resource set is not used to transmit downlink control information (DCI), including: the at least one time unit is a non-downlink control channel monitoring time point, or the at least one time unit is allocated as an uplink transmission resource.

In the embodiment of the present disclosure, the second time domain resource set does not include a time unit $(n-K_{1,k})$ in the first time domain resource set, where a time unit $(n-K_{1,k}-\tilde{K}_0)$ is not used to transmit the downlink control information (DCI), n is the target time unit, $K_{1,k}$ is a $k^{th}$ value in the ACK/NACK feedback timing sequence set, and $\tilde{K}_0$ is a downlink scheduling timing sequence set.

In the embodiment of the present disclosure, each element in the downlink scheduling timing sequence set corresponds to a value of a downlink scheduling sequence in each row of a physical downlink shared channel (PDSCH) symbol allocation table; or each element in the downlink scheduling timing sequence set corresponds to a value of a downlink scheduling sequence in at least one row of the PDSCH symbol allocation table, and values of different elements in the downlink scheduling timing sequence set are different.

In the embodiment of the present disclosure, the downlink data includes a physical downlink shared channel (PDSCH) and/or a physical downlink control channel (PDCCH) indicating a semi-persistent scheduling (SPS) resource release.

In the embodiment of the present disclosure, the one time unit is one time slot.

It should be understood that an interaction between the network device and the terminal device and related features, functions, and the like described by a network side correspond to related features and functions of the terminal device. And related contents have been described in detail in the above method 100. For brevity, details are not described herein again.

It should also be understood that, in various embodiments of the present disclosure, the order of the sequence numbers of the above processes does not mean an order of an execution sequence, and the execution sequence of each process should be determined by its function and internal logic, and should not constitute any limitation to the implementations of the embodiments of the present disclosure.

The method for transmitting the uplink control information according to the embodiment of the present disclosure is described in detail above. Devices for transmitting uplink control information according to the embodiments of the present disclosure are described below in combination with FIG. 6 and FIG. 9, and the technical features described in the method embodiment are applicable to the following device examples.

Figure 6:
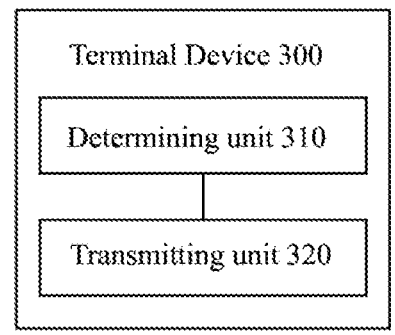
FIG. 6 shows a schematic block diagram of a terminal device according to an embodiment of the present disclosure.

FIG. 6 shows a schematic block diagram of a terminal device 300 according to an embodiment of the present disclosure. As shown in FIG. 6, the terminal device 300 includes:

a determining unit 310, configured to determine a second time domain resource set according to a pre-configured first time domain resource set, each time unit in the second time domain resource set is a candidate time domain unit for transmitting downlink data, where the first time domain resource set is determined according to an ACK/NACK feedback timing sequence set of the downlink data; and a transmitting unit 320, configured to transmit, in a target time unit, ACK/NACK feedback information corresponding to each time unit in the second time domain resource set to a network device.

Therefore, the terminal device in the embodiment of the present disclosure can reduce ACK/NACK feedback overhead when the second time domain resource set is a subset of the first time domain resource set.

In the embodiment of the present disclosure, the determining unit is specifically configured to: determine the second time domain resource set from the first time domain resource set according to a pre-configured downlink scheduling timing sequence set.

In the embodiment of the present disclosure, each element in the downlink scheduling timing sequence set corresponds to a value of a downlink scheduling sequence in each row of a physical downlink shared channel (PDSCH) symbol allocation table; or each element in the downlink scheduling timing sequence set corresponds to a value of a downlink scheduling sequence in at least one row of the PDSCH symbol allocation table, and values of different elements in the downlink scheduling timing sequence set are different.

In the embodiment of the present disclosure, the determining unit is specifically configured to: determine, if all time units of at least one time unit corresponding to a first downlink time unit in the first time domain resource set are not used to transmit downlink control information (DCI), that the second time domain resource set does not include the first downlink time unit; or determine, if at least one time unit corresponding to the first downlink time unit in the first time domain resource set is used to transmit the downlink control information, that the second time domain resource set includes the first downlink time unit.

In the embodiment of the present disclosure, the all time units of at least one time unit corresponding to the first downlink time unit in the first time domain resource set are not used to transmit downlink control information (DCI), including: the at least one time unit is a non-downlink control channel monitoring time point, or the at least one time unit is allocated as an uplink transmission resource.

In the embodiment of the present disclosure, the determining unit is specifically configured to: determine that a time unit $(n-K_{1,k})$ in the first time domain resource set is not a time unit in the second time domain resource set, where a time unit $(n-K_{1,k}-\tilde{K}_0)$ is not used to transmit the downlink control information, n is the target time unit, $K_{1,k}$ is a $k^{th}$ value in the ACK/NACK feedback timing sequence set, and $\tilde{K}_0$ is the downlink scheduling timing sequence set.

In the embodiment of the present disclosure, the downlink data includes a physical downlink shared channel (PDSCH) and/or a physical downlink control channel (PDCCH) indicating a semi-persistent scheduling (SPS) resource release.

In this embodiment of the present disclosure, the one time unit is one time slot.

Figure 4:
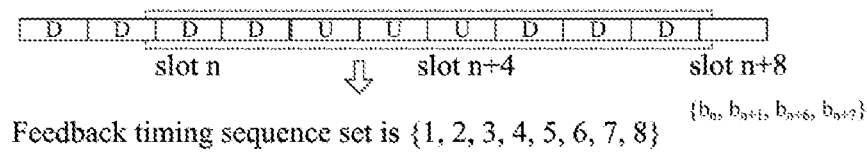
FIG. 4 shows still another schematic block diagram of a method for transmitting uplink control information according to an embodiment of the present disclosure.

It should be understood that the terminal device 300 according to the embodiment of the present disclosure may correspond to the terminal device in the method embodiment of the present disclosure, and the above and other operations and/or functions of various units in the terminal device 300 are respectively used to implement corresponding processes of the terminal device in the method of the FIG. 2 to FIG. 4. For brevity, details are not described herein again.

Figure 7:
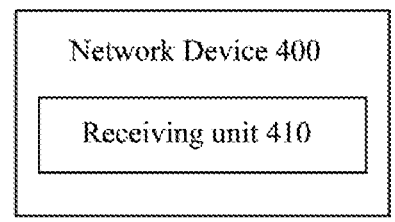
FIG. 7 shows a schematic block diagram of a network device according to an embodiment of the present disclosure.

FIG. 7 shows a schematic block diagram of a network device 400 according to an embodiment of the present disclosure. As shown in FIG. 7, the network device 400 includes:

a receiving unit 410, configured to receive, in a target time unit, feedback information corresponding to each time unit in a second time domain set transmitted by a terminal device, where the second time domain resource set is determined from a pre-configured first time domain resource set, each time unit in the second time domain resource set is a candidate time domain unit for transmitting downlink data, and the first time domain resource set is determined according to an Acknowledgement (ACK)/Negative Acknowledgement (NACK) feedback timing sequence set of the downlink data.

Therefore, the network device in the embodiment of the present disclosure can reduce ACK/NACK feedback overhead when the second time domain resource set is a subset of the first time domain resource set.

In the embodiment of the present disclosure, the second time domain resource set does not include a first downlink time unit in the first time domain resource set, where all time units of at least one time unit corresponding to the first downlink time unit are not used to transmit downlink control information (DCI).

In the embodiment of the present disclosure, the at least one time unit corresponding to the first downlink time unit in the first time domain resource set is not used to transmit downlink control information (DCI), including: the at least one time unit is a non-downlink control channel monitoring time point, or the at least one time unit is allocated as an uplink transmission resource.

In the embodiment of the present disclosure, the second time domain resource set does not include a time unit $(n-K_{1,k})$ in the first time domain resource set, where a time unit $(n-K_{1,k}-\tilde{K}_0)$ is not used to the transmit downlink control information (DCI), n is the target time unit, $K_{1,k}$ is a $k^{th}$ value in the ACK/NACK feedback timing sequence set, and $\tilde{K}_0$ is a downlink scheduling timing sequence set.

In the embodiment of the present disclosure, each element in the downlink scheduling timing sequence set corresponds to a value of a downlink scheduling sequence in each row of a physical downlink shared channel (PDSCH) symbol allocation table; or each element in the downlink scheduling timing sequence set corresponds to a value of a downlink scheduling sequence in at least one row of the PDSCH symbol allocation table, and values of different elements in the downlink scheduling timing sequence set are different.

In the embodiment of the present disclosure, the downlink data includes a physical downlink shared channel (PDSCH) and/or a physical downlink control channel (PDCCH) indicating a semi-persistent scheduling (SPS) resource release.

In this embodiment of the present disclosure, the one time unit is one time slot.

It should be understood that the network device 400 according to the embodiment of the present disclosure may correspond to the network device in the method embodiment of the present disclosure, and the above and other operations and/or functions of various units in the network device 400 are respectively used to implement corresponding processes of the network device in the method of the FIG. 5. For brevity, details are not described herein again.

Figure 8:
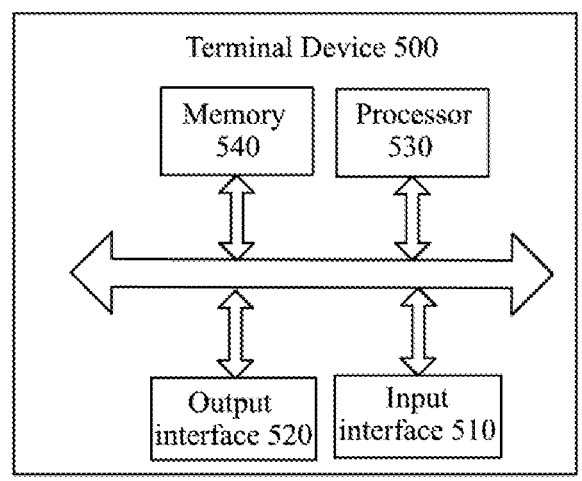
FIG. 8 shows another schematic block diagram of a terminal device according to an embodiment of the present disclosure.

As shown in FIG. 8, the embodiment of the present disclosure further provides a terminal device 500, the terminal device 500 may be the terminal device 300 in FIG. 6, which can be configured to perform the content of the terminal device corresponding to the method 100 in FIG. 2. The terminal device 500 includes: an input interface 510, an output interface 520, a processor 530, and a memory 540. The input interface 510, the output interface 520, the processor 530, and the memory 540 can be connected by a bus system. The memory 540 is configured to store programs, instructions or codes. The processor 530 is configured to execute the programs, instructions or codes in the memory 540 to control the input interface 510 to receive signals, control the output interface 520 to transmit signals, and complete the operations in the above method embodiments.

Therefore, the terminal device in the embodiment of the present disclosure can reduce the ACK/NACK feedback overhead when the second time domain resource set is a subset of the first time domain resource set.

It should be understood that, in the embodiment of the present disclosure, the processor 530 may be a Central Processing Unit (CPU), and the processor 530 may also be other general purpose processors, digital signal processors, application specific integrated circuits, and field programmable gate arrays or other programmable logic devices, discrete gates or transistor logic devices, discrete hardware components, or the like. The general purpose processors may be microprocessors or the processor may also be any conventional processor or the like.

The memory 540 may include read only memory and random access memory and provides instructions and data to the processor 530. A portion of the memory 540 may also include a non-volatile random access memory. For example, the memory 540 can also store information of device types.

In an implementation process, each content of the above method may be completed by an integrated logic circuit of hardware in the processor 530 or instructions in a form of software. The content of the method disclosed in combination with the embodiments of the present disclosure may be directly embodied as performed by a hardware processor, or may be performed by a combination of hardware and software modules in the processor. The software module can be located in a conventional storage medium in the art such as random access memory, flash memory, read only memory, programmable read only memory or electrically erasable programmable memory, registers, or the like. The storage medium is located in the memory 540, and the processor 530 reads information in the memory 540 and combines its hardware to complete the contents of the above method. To avoid repetition, it will not be described in detail here.

In a specific implementation, the transmitting unit in the terminal device 300 can be implemented by the output interface 520 in FIG. 8, and the determining unit in the terminal device 300 can be implemented by the processor 530 in FIG. 8.

Figure 9:
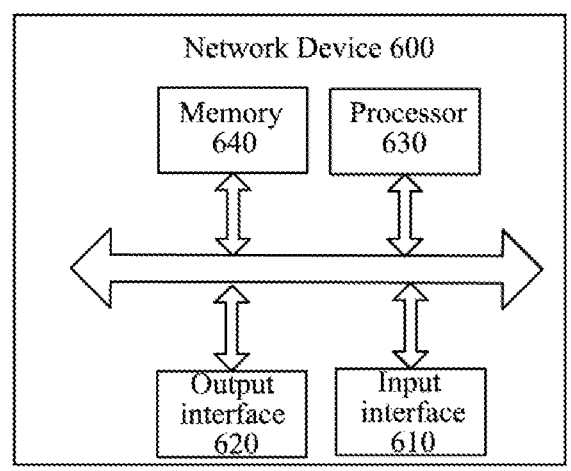
FIG. 9 shows another schematic block diagram of a network device according to an embodiment of the present disclosure.

As shown in FIG. 9, the embodiment of the present disclosure further provides a network device 600, the network device 600 may be the network device 400 in FIG. 7, which can be used to perform the content of the network device corresponding to the method 200 in FIG. 5. The network device 600 includes an input interface 610, an output interface 620, a processor 630, and a memory 640. The input interface 610, the output interface 620, the processor 630, and the memory 640 can be connected by a bus system. The memory 640 is configured to store programs, instructions or codes. The processor 630 is configured to execute the programs, instructions or codes in the memory 640 to control the input interface 610 to receive signals, control the output interface 620 to transmit the signals, and complete the operations in the above method embodiments.

Therefore, the network device in the embodiment of the present disclosure can reduce the ACK/NACK feedback overhead when the second time domain resource set is a subset of the first time domain resource set.

It should be understood that, in the embodiment of the present disclosure, the processor 630 may be a central processing unit (CPU), and the processor 630 may also be other general-purpose processors, digital signal processors, application specific integrated circuits, field programmable gate arrays or other programmable logic devices, discrete gates or transistor logic devices, discrete hardware components, or the like. The general purpose processors may be microprocessors or the processor may also be any conventional processor or the like.

The memory 640 can include read only memory and random access memory and provides instructions and data to the processor 630. A portion of the memory 640 can also include a non-volatile random access memory. For example, the memory 640 can also store information of device types.

In an implementation process, each content of the above method may be completed by an integrated logic circuit of hardware in the processor 630 or instructions in a form of software. The content of the method disclosed in the embodiments of the present disclosure may be directly embodied as performed by a hardware processor, or may be performed by a combination of hardware and software modules in the processor. The software module can be located in a conventional storage medium in the art such as random access memory, flash memory, read only memory, programmable read only memory or electrically erasable programmable memory, registers, or the like. The storage medium is located in the memory 640, and the processor 630 reads information in the memory 640 and combines its hardware to complete the contents of the above method. To avoid repetition, it will not be described in detail here.

In a specific embodiment, the receiving unit in the network device 400 can be implemented by the input interface 610 in FIG. 9.

Those of ordinary skill in the art will appreciate that the units and algorithm steps of the various examples described in combination with the embodiments disclosed herein can be implemented by electronic hardware or a combination of computer software and electronic hardware. Whether these functions are performed in hardware or software depends on specific applications and design constraints of the technical solutions. A person skilled in the art can use different methods to implement the described functions for each particular application, but such implementations should not be considered to be beyond the scope of the present disclosure.

A person skilled in the art can clearly understand that for the convenience and brevity of the description, the specific operation processes of the systems, devices and units described above can refer to the corresponding processes in the above method embodiment, and details are not described herein again.

In the several embodiments provided by the present disclosure, it should be understood that the disclosed systems, devices, and methods may be implemented in other manners. For example, the device embodiments described above are merely illustrative, for example, the division of the unit is only a logical function division. In an actual implementation, there may be another division manner, for example, multiple units or components may be combined or may be integrated into another system, or some features can be ignored or not executed. In addition, the shown or discussed coupling or direct coupling or communication connection between each other may be an indirect coupling or communication connection through some interfaces, devices or units, and may be in electrical, mechanical or other forms.

The units illustrated as separate components may or may not be physically separated, and the components displayed as units may or may not be physical units, that is, may be located in one place, or may be distributed to multiple network units. Some or all of the units may be selected according to actual needs to implement the purpose of the solution of the embodiment.

In addition, each functional unit in each embodiment of the present disclosure may be integrated into one processing unit, or each unit may exist physically separately, or two or more units may be integrated into one unit.

This functionality, if implemented as a software functional unit and sold or used as a standalone product, can be stored in a computer readable storage medium. Based on such understanding, the technical solution of the present disclosure essentially, or a part of contributing to the prior art, or a part of the technical solution, may be embodied in a form of a software product, the computer software product is stored in a storage medium, which includes a number of instructions for causing a computer device (which may be a personal computer, server, or network device, or the like) to perform all or part of the steps of various embodiments of the present disclosure. The foregoing storage medium includes various medium that can store program codes: a U disk, a mobile hard disk, a Read-Only Memory (ROM), a Random Access Memory (RAM), a magnetic disk, or an optical disk, or the like.

The above mentioned are only specific implementations of the present disclosure, but the protection scope of the present disclosure is not limited thereto, and any person skilled in the art can easily think of changes or substitutions within the technical scope disclosed in the present disclosure, which should be covered in the protection scope of the present disclosure. Therefore, the protection scope of the present disclosure should be determined by the protection scope of the claims.

What is claimed is:

1. A method for transmitting uplink control information, comprising:
   determining, by a terminal device, a second time domain resource set from a pre-configured first time domain resource set according to a pre-configured downlink scheduling timing sequence set, wherein a value of each element in the downlink scheduling timing sequence set represents a time interval between downlink control information, DCI, and a corresponding physical downlink shared channel, PDSCH, wherein each time unit in the second time domain resource set is a time unit for transmitting downlink data, wherein the first time domain resource set is determined according to a target time unit and a pre-configured Acknowledgement (ACK)/Negative Acknowledgement (NACK) feedback timing sequence set of the downlink data; and transmitting, by the terminal device, in the target time unit, ACK/NACK feedback information corresponding to each time unit in the second time domain resource set to a network device.

2. The method according to claim 1, wherein each element in the downlink scheduling timing sequence set corresponds to a value of a downlink scheduling timing sequence in each row of a physical downlink shared channel (PDSCH) symbol allocation table; or each element in the downlink scheduling timing sequence set corresponds to a value of a downlink scheduling timing sequence in at least one row of the PDSCH symbol allocation table, and values of different elements in the downlink scheduling timing sequence set are different;

wherein each row of the PDSCH symbol allocation table has one value of downlink scheduling timing sequence.

3. The method according to claim 1, wherein the determining, by a terminal device, a second time domain resource set from a pre-configured first time domain resource set according to a pre-configured downlink scheduling timing sequence set, comprises:

determining, by the terminal device, if at least one time unit corresponding to a first downlink time unit in the first time domain resource set is not used to transmit downlink control information (DCI), that the second time domain resource set does not include a first time unit; or determining, by the terminal device, if the at least one time unit corresponding to a first time unit in the first time domain resource set is used to transmit the downlink control information, that the second time domain resource set includes the first time unit.

4. The method according to claim 3, wherein the at least one time unit corresponding to a first downlink time unit in the first time domain resource set is not used to transmit downlink control information (DCI), comprises:

the at least one time unit is a non-downlink control channel monitoring time point, or the at least one time unit is allocated as an uplink transmission resource.

5. The method according to claim 1, wherein the determining, by a terminal device, a second time domain resource set from a first time domain resource set according to a pre-configured downlink scheduling timing sequence set, comprises:

determining, by the terminal device, that a time unit $(n-K_{1,k})$ in the first time domain resource set is not a time unit in the second time domain resource set, wherein, a time unit $(n-K_{1,k}-\tilde{K}_0)$ is not used to transmit downlink control information (DCI), n is the target time unit, $K_{1,k}$ is a $k^{th}$ value in the ACK/NACK feedback timing sequence set, and $\tilde{K}_0$ is the downlink scheduling timing sequence set.

6. The method according to claim 1, wherein the downlink data comprises a physical downlink shared channel (PDSCH) and/or a physical downlink control channel (PDCCH) indicating a semi-persistent scheduling (SPS) resource release.

7. The method according to claim 1, wherein the one time unit is one time slot.

8. A terminal device, wherein the terminal device comprising: an input interface, an output interface, a processor, and a memory; wherein the processor, configured to determine a second time domain resource set from a pre-configured first time domain resource set according to a pre-configured downlink scheduling timing sequence set, wherein a value of each element in the downlink scheduling timing sequence set represents a time interval between downlink control information, DCI, and a corresponding physical downlink shared channel, PDSCH, wherein each time unit in the second time domain resource set is a time unit for transmitting downlink data, wherein, the first time domain resource set is determined according to a target time unit and a pre-configured Acknowledgement (ACK)/Negative Acknowledgement (NACK) feedback timing sequence set of the downlink data; and the output interface, configured to transmit, in the target time unit, ACK/NACK feedback information corresponding to each time unit in the second time domain resource set to a network device.

9. The terminal device according to claim 8, wherein each element in the downlink scheduling timing sequence set corresponds to a value of a downlink scheduling timing sequence in each row of a physical downlink shared channel (PDSCH) symbol allocation table; or each element in the downlink scheduling timing sequence set corresponds to a value of a downlink scheduling timing sequence in at least one row of the PDSCH symbol allocation table, and values of different elements in the downlink scheduling timing sequence set are different;

wherein each row of the PDSCH symbol allocation table has one value of downlink scheduling timing sequence.

10. The terminal device according to claim 8, wherein the processor is configured to:

determine, if at least one time unit corresponding to the first downlink time unit in the first time domain resource set is not used to transmit downlink control information (DCI), that the second time domain resource set does not include the first time unit; or determine, if the at least one time unit corresponding to the first time unit in the first time domain resource set is used to transmit the downlink control information, that the second time domain resource set includes the first time unit.

11. The terminal device according to claim 10, wherein the at least one time unit corresponding to the first downlink time unit in the first time domain resource set are not used to transmit downlink control information (DCI), comprises:

the at least one time unit is a non-downlink control channel monitoring time point, or the at least one time unit is allocated as an uplink transmission resource.

12. The terminal device according to claim 8, wherein the processor is configured to:

determine that a time unit $(n-K_{1,k})$ in the first time domain resource set is not a time unit in the second time domain resource set, wherein a time unit $(n-K_{1,k}-\tilde{K}_0)$ is not used to transmit downlink control information (DCI), n is the target time unit, $K_{1,k}$ is a $k^{th}$ value in the ACK/NACK feedback timing sequence set, and $\tilde{K}_0$ is the downlink scheduling timing sequence set.

13. The terminal device according to claim 8, wherein the downlink data comprises a physical downlink shared channel (PDSCH) and/or a physical downlink control channel (PDCCH) indicating a semi-persistent scheduling (SPS) resource release.

14. The terminal device according to claim 8, wherein the one time unit is one time slot.

15. A network device, wherein the network device comprising: an input interface, an output interface, a processor, and a memory; wherein
the processor, configured to receive, in a target time unit, feedback information corresponding to each time unit in a second time domain resource set transmitted by a terminal device, wherein, the second time domain resource set is determined from a pre-configured first time domain resource set according to a pre-configured downlink scheduling timing sequence set, wherein a value of each element in the downlink scheduling timing sequence set represents a time interval between downlink control information, DCI, and a corresponding physical downlink shared channel, PDSCH, each time unit in the second time domain resource set is a time unit for transmitting downlink data, and the first time domain resource set is determined according to the target time unit and a pre-configured Acknowledgement (ACK)/Negative Acknowledgement (NACK) feedback timing sequence set of the downlink data.

16. The network device according to claim 15, wherein the second time domain resource set does not include a first time unit in the first time domain resource set, wherein, at least one time unit corresponding to the first downlink time unit are not used to transmit downlink control information (DCI).

17. The network device according to claim 16, wherein the at least one time unit corresponding to a first do time unit in the first time domain resource set is not used to transmit downlink control information (DCI), comprises:
the at least one time unit is a non-downlink control channel monitoring time point, or
the at least one time unit is allocated as an uplink transmission resource.

18. The network device according to claim 15, wherein the second time domain resource set does not include a time unit $(n-K_{1,k})$ in the first time domain resource set, wherein a time unit $(n-K_{1,k}-\tilde{K}_0)$ is not used to transmit downlink control information (DCI), n is the target time unit, $K_{1,k}$ is a $k^{th}$ value in the ACK/NACK feedback timing sequence set, and $\tilde{K}_0$ is a downlink scheduling timing sequence set;
wherein each element in the downlink scheduling timing sequence set corresponds to a value of a downlink scheduling timing sequence in each row of a physical downlink shared channel (PDSCH) symbol allocation table; or
each element in the downlink scheduling timing sequence set corresponds to a value of a downlink scheduling timing sequence in at least one row of the PDSCH symbol allocation table, and values of different elements in the downlink scheduling timing sequence set are different;
wherein each row of the PDSCH symbol allocation table has one value of downlink scheduling timing sequence.

* * * * *